(12) United States Patent
Po et al.

(10) Patent No.: US 10,095,089 B2
(45) Date of Patent: Oct. 9, 2018

(54) LENS MOUNT ASSEMBLY

(71) Applicant: RAYTHEON COMPANY, Waltham, MA (US)

(72) Inventors: Li Chiao Po, El Segundo, CA (US); Ray McVey, El Segundo, CA (US)

(73) Assignee: RAYTHEON COMPANY, Waltham, MA (US)

( * ) Notice: Subject to any disclaimer, the term of this patent is extended or adjusted under 35 U.S.C. 154(b) by 227 days.

(21) Appl. No.: 15/156,865

(22) Filed: May 17, 2016

(65) Prior Publication Data

US 2018/0004070 A1    Jan. 4, 2018

(51) Int. Cl.
| | |
|---|---|
| *G03B 17/12* | (2006.01) |
| *B64D 47/08* | (2006.01) |
| *G02B 7/00* | (2006.01) |
| *G02B 7/02* | (2006.01) |
| *H04N 5/225* | (2006.01) |
| *G03B 17/56* | (2006.01) |
| *G02B 13/00* | (2006.01) |
| *G02B 7/182* | (2006.01) |

(52) U.S. Cl.
CPC ............ *G03B 17/12* (2013.01); *B64D 47/08* (2013.01); *G02B 7/004* (2013.01); *G02B 7/021* (2013.01); *G02B 7/026* (2013.01); *G02B 7/028* (2013.01); *G03B 17/565* (2013.01); *H04N 5/2252* (2013.01); *H04N 5/2254* (2013.01); *G02B 7/023* (2013.01); *G02B 7/1825* (2013.01); *G02B 13/008* (2013.01)

(58) Field of Classification Search
None
See application file for complete search history.

(56) References Cited

U.S. PATENT DOCUMENTS

| | | | | |
|---|---|---|---|---|
| 4,925,286 A | * | 5/1990 | Cutburth | G02B 7/1825 248/485 |
| 5,570,238 A | | 10/1996 | Leary | |
| 6,388,823 B1 | | 5/2002 | Gaber et al. | |
| 6,922,293 B2 | * | 7/2005 | Watson | G02B 7/023 359/819 |
| 7,270,022 B2 | | 9/2007 | Devenyl | |
| 7,289,282 B2 | * | 10/2007 | Matsushima | G02B 7/023 359/811 |

(Continued)

FOREIGN PATENT DOCUMENTS

| | | |
|---|---|---|
| DE | 102006038682 A1 | 3/2007 |
| EP | 1489448 A1 | 12/2004 |

OTHER PUBLICATIONS

International Search Report and Written Opinion for application No. PCT/US2017/016116 dated Nov. 6, 2017.

*Primary Examiner* — Twyler L Haskins
*Assistant Examiner* — Quan Pham
(74) *Attorney, Agent, or Firm* — Lando & Anastasi, LLP

(57) ABSTRACT

A lens mount assembly is configured to support a lens assembly having a lens ring and at least one lens secured to the lens ring. The lens mount assembly includes a ring mount having an annular body with at least two retaining arms that project from the annular body, a flexure configured to be secured to the ring mount, and at least two bellows. Each bellows is configured to be secured to a respective retaining arm of the at least two retaining arms of the ring mount. The at least two bellows further are configured to engage the flexure.

20 Claims, 5 Drawing Sheets

(56) References Cited

U.S. PATENT DOCUMENTS

| | | |
|---|---|---|
| 8,829,416 B2 | 9/2014 | Donce |
| 2001/0033437 A1 | 10/2001 | Meehan et al. |
| 2004/0174619 A1* | 9/2004 | Beck ................ G02B 7/023 359/819 |
| 2004/0257682 A1 | 12/2004 | Watts |
| 2005/0219720 A1* | 10/2005 | Yura ................ G02B 7/028 359/820 |
| 2006/0082907 A1 | 4/2006 | Murasato |
| 2009/0091720 A1* | 4/2009 | Bertele ................ F15B 15/10 355/52 |
| 2009/0310107 A1* | 12/2009 | Sato ................ G03B 27/42 355/53 |
| 2011/0141335 A1* | 6/2011 | Cheng ................ G02B 7/026 348/335 |

\* cited by examiner

LENS MOUNT ASSEMBLY

FEDERALLY SPONSORED RESEARCH

This invention was made with government support under Grant No. H94003-04-D-0006-0228 awarded by Air Force Research Laboratory. The U.S. government has certain rights in this invention.

BACKGROUND OF THE INVENTION

Modern tactical aircraft use a number of imaging aids to assist the crew in viewing a scene, selecting targets in the scene, and directing weapons against the selected targets. Visible, infrared, and/or specific spectral bands imaging devices are used in various applications to form an image of the scene. The type imaging spectrum depends upon the mission, weather conditions, the nature of the scene, as well as other factors.

One form of an infrared optical system includes several lenses made of infrared-transparent lens materials. The lenses are arranged at proper positions along an optical path to achieve desired effects by a lens mount assembly. The refractive index and other optical properties of infrared lens materials are strongly dependent on temperature, which impacts the ability of the lens mount assembly to properly position the lens. If the temperature changes so that the optical properties of the lens materials change, the lenses may no longer be properly positioned relative to one another, and the performance of the infrared optical system may be compromised.

Examples of lens mount assemblies can be found in U.S. Pat. Nos. 5,570,238, 7,270,022 and 8,829,416 and U.S. Patent Application Publication No. 2004/0257682 A1.

SUMMARY OF INVENTION

One aspect of the present disclosure is directed to a lens mount assembly configured to support a lens assembly having a lens ring and at least one lens secured to the lens ring. In one embodiment, the lens mount assembly comprises a ring mount including an annular body having at least two retaining arms that project from the annular body, a flexure configured to be secured to the ring mount, and at least two bellows. Each bellows is configured to be secured to a respective retaining arm of the at least two retaining arms of the ring mount. The at least two bellows further are configured to engage the flexure.

Embodiments of the lens mount assembly further may include configuring each retaining arm of the at least two retaining arms to project perpendicularly from the annular body of the ring mount. The at least two retaining arms may include three retaining arms and the at least two bellows include three bellows. The three retaining arms may be spaced equidistant from one another. Each retaining arm may include a tab portion that projects over the lens assembly when the lens assembly is assembled onto the ring mount. Each tab portion may include a first opening sized to receive at least a portion of the bellows therein and a second opening sized to receive a positioning pin or fastener to secure the retaining arm of the ring mount of the lens mount assembly in place. The ring mount further may include three feet, which are spaced between adjacent retaining arms. The feet may be positioned equidistant between adjacent retaining arms. Each foot may include a retaining edge to firmly secure the flexure within the ring mount. The flexure may be sized to fit within the ring mount, and may engage by the three feet of the ring mount with the retaining edges of the ring feet surrounding an outer edge of the flexure. The flexure may include three wider portions, with each wider portion having an opening formed therein to receive a fastener therein to secure the flexure to the feet of the ring mount. Each bellows may include two cylindrical end pieces and a bellow positioned between the end pieces. A first end piece may include an outer surface that is configured to engage a tab portion of the retaining arm of the ring mount within an opening of the tab portion where both surfaces are threaded to allow for fine adjustment. A second other end piece may be configured to be seated within a boss of a tab portion of the lens ring when assembled. A space between the end pieces that is surrounded by the bellow may be filled with a fluid that is configured for use in single phase heat transfer applications with high coefficient of thermal expansion ("CTE").

Another aspect of the present disclosure is directed to a method of assembling a lens assembly including a lens ring and at least one lens to a lens mount assembly including a ring mount, a flexure and at least two bellows. In one embodiment, the method comprises: securing the flexure of the lens mount assembly to the ring mount of the lens mount assembly; positioning the lens ring of the lens assembly against the flexure so that tab portions of the lens ring is aligned with tab portions of the ring mount; and securing bellows to the ring mount so that the bellows engage the lens ring.

Embodiments of the method further may include securing the flexure to feet of the ring mount by the at least two fasteners. The at least two fasteners may be accessed through the openings provided in the ring mount. The bellows may be secured to the ring mount by a plurality of fasteners.

A further aspect of the present disclosure is directed to an optical platform comprising a housing and an optical device configured to be supported by the housing. The optical device comprises a lens assembly and a lens mount assembly configured to support the lens assembly. The lens mount assembly comprises a ring mount, a flexure configured to be secured to the ring mount, and at least two bellows. Each bellows is configured to be secured to the ring mount and to engage the flexure.

BRIEF DESCRIPTION OF THE DRAWINGS

Various aspects of at least one embodiment are discussed below with reference to the accompanying figures, which are not intended to be drawn to scale. Where technical features in the figures, detailed description or any claim are followed by references signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures:

DETAILED DESCRIPTION OF THE INVENTION

Figure 1:
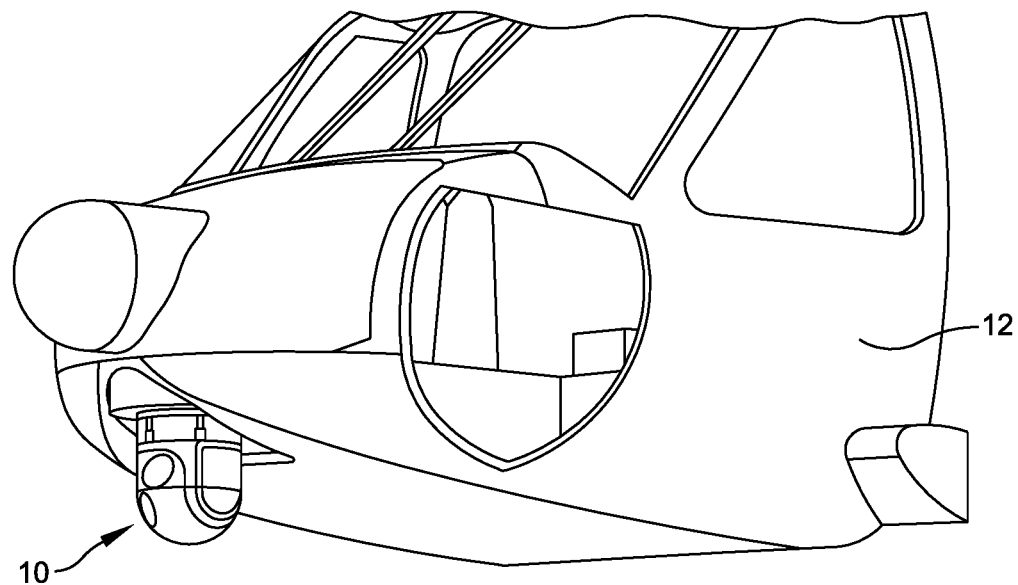
FIG. 1 is a perspective view of an aircraft having an optical platform.

Passive a thermal lens mounts are critical to minimizing system wave front error under fluctuating operational temperature. Conventional passive athermalized mount design solutions using linear bearings to control axial lens movement and non-metallic expansion rods for focus compensation have several draw backs, such as excessive space, imprecise axial/focus translation, low mean time between failures ("MTBF") due to excessive localized wear on the bearings, foreign object damage or debris ("FOD") from bearing lubricants, sluggish thermal transient response, sensitive to change in humidity, and difficulty to incorporate tilt correction.

There are numerous different techniques to correct focus error due to temperature variation, including concentric tubes of materials with different CTE resulting in focus shift, single liquid filled bellow, piston driven hydraulic reservoir, bi-metallic strips, and active electronic positioning.

An a thermal lens mount assembly disclosed herein utilizes a flat annular sheet metal ring flexure in concert with liquid filled metal bellows to provide support for an objective lens assembly. These components are inherently space-efficient by being thin/small. When assembled, the resultant space occupied by the mount assembly is minimized. In one embodiment, three bellows are used to secure a lens assembly to a ring mount and the flexure. In particular, the single annular flexure is attached at three points to the base mount, with the flexure functioning as a spring to provide a preload to secure the lens assembly in focus. The flexure on the a thermal lens mount assembly also provides the stiffness to resist lateral and rotational movements.

The lens assembly, when assembled, is free to translate in a focus direction due to the expansion and contraction of the bellows. There are no sliding surfaces, thus doing away with mechanical looseness as long as a sufficient preload is maintained. By designing the flexure to not exceed the endurance stress of the metal from which it is composed of, the flexure is able to endure much more translation cycle in focus due to changes in temperature. MTBF for the mount assembly is greatly improved. Optical assemblies are very sensitive to FOD, such as bearing lubricant or metal particles from metal to metal contact. The flexure and the liquid-filled bellows do not need lubricant, and there is no metal-to-metal contact between the components of the assembly, thereby achieving minimal FOD. Liquid-filled bellows of metal construction has much higher thermal sensitivity compared to metallic or polymeric rods of similar stiffness and CTE due to lower thermal mass attributed to higher thermal conductivity and smaller size.

Higher thermal sensitivity translates into quicker transient response to temperature fluctuation leading to lower real-time wave front error ("WFE"). All metal construction provides a platform impervious to moisture or humidity. Bellows and the flexures can accommodate small tilt error by design. The height of the bellows can be adjusted independently. As a result, tilt on the lens mount assembly can be zeroed out.

One aspect of the lens mount assembly of embodiments of the present disclosure is the seamless synthesis of two volume efficient components, which are an annular ring shaped flexure providing frictionless and zero wear focus movement as well as preload to the lens assembly, and a fluid-filled bellows to provide accurate thermal compensation. These two components eliminate drawbacks experienced on traditional thermal compensation mounts like excessive movement and bulk.

It is to be appreciated that embodiments of the assemblies and methods discussed herein are not limited in application to the details of construction and the arrangement of components set forth in the following description or illustrated in the accompanying drawings. The assemblies and methods are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Figure 2:
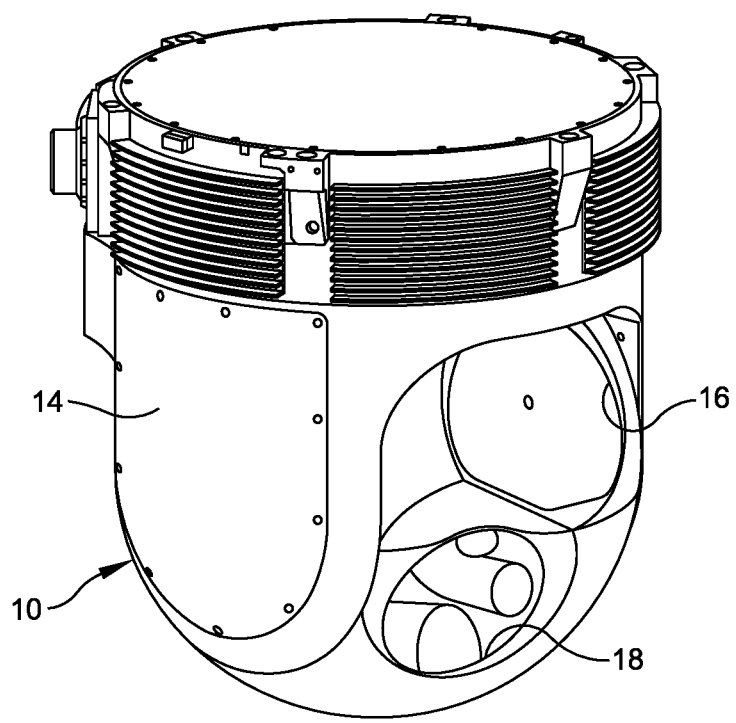
FIG. 2 is a perspective view of the optical platform configured to support an optical assembly.

Referring to the drawings, and more particularly to FIGS. 1 and 2, an optical platform generally indicated at 10 is shown mounted on an aircraft 12, such as a helicopter. As shown, the optical platform 10 is positioned at the front of the aircraft 12, and includes a semi-spherically-shaped housing 14 configured to support a number of optical devices. In one embodiment, the housing 14 of the optical platform 10 is configured to include a light detection and ranging ("LADAR") assembly window 16 and a forward looking infrared ("FLIR") window 18, which respectively support a LADAR assembly and a FLIR camera. It should be understood that the optical platform 10 may be configured to support any number of optical devices having lens assemblies requiring support within the housing 14 of the optical platform.

Referring to FIGS. 3-6, in one embodiment, behind the FLIR window 18 includes an a thermal lens mount assembly, generally indicated at 20, that is secured to a frame 22 of the optical platform 10. As shown, the lens mount assembly 20, when assembled to the frame 22 is free to translate a lens assembly, generally indicated at 24, in a desired (focus) direction. The lens assembly 24 can be configured to include a lens ring generally indicated at 26 and a plurality of lenses 28 secured to and supported by an inner lens ring 29. The lens ring 26 includes an annular body 30 having three tab portions, each indicated at 32. The inner lens ring 29, which is used to correct minor lens centration errors, is housed within the annular body 30 of the lens ring 26. Once the errors are corrected, the inner lens ring 29 is bonded to the annular body 30 of the lens ring 26. Each tab portion 32 of the annular body 30 of the lens ring 28 has a circular boss 34 formed therein. The tab portions 32 of the annular body 30 are used to position and secure the lens assembly 24 to the lens mount assembly 20, which is capable of providing tilt adjustability of the lens assembly. In a certain embodiment, the annular body 30 of the lens ring 26 and the inner lens ring 29 of the lens assembly 24 are fabricated from a metal alloy, such as 6061 aluminum alloy and is approximately 3.0 inches in diameter. It should be noted that the lens ring 26 may be fabricated from any type of suitable material and be sized to accommodate a desired lens size.

Figure 4:
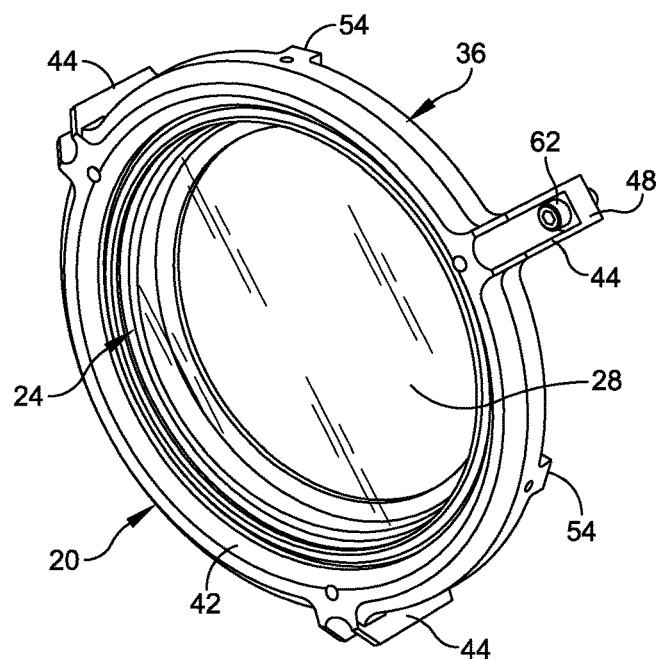
FIG. 4 is a front perspective view of the lens mount assembly.
Figure 5:
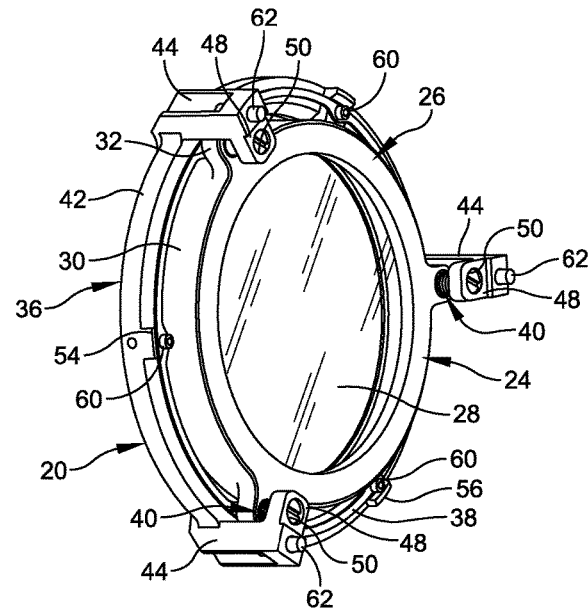
FIG. 5 is a back perspective view of the lens mount assembly.
Figure 6:
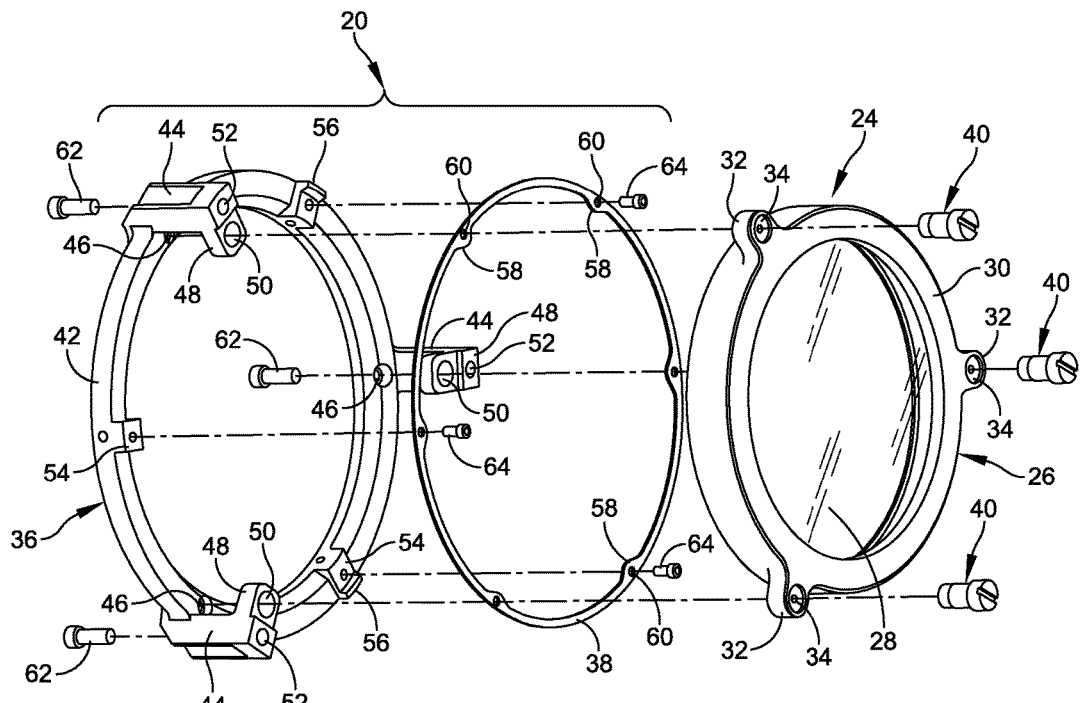
FIG. 6 is an exploded perspective view of the lens mount assembly shown in FIG. 5.
Figure 7:
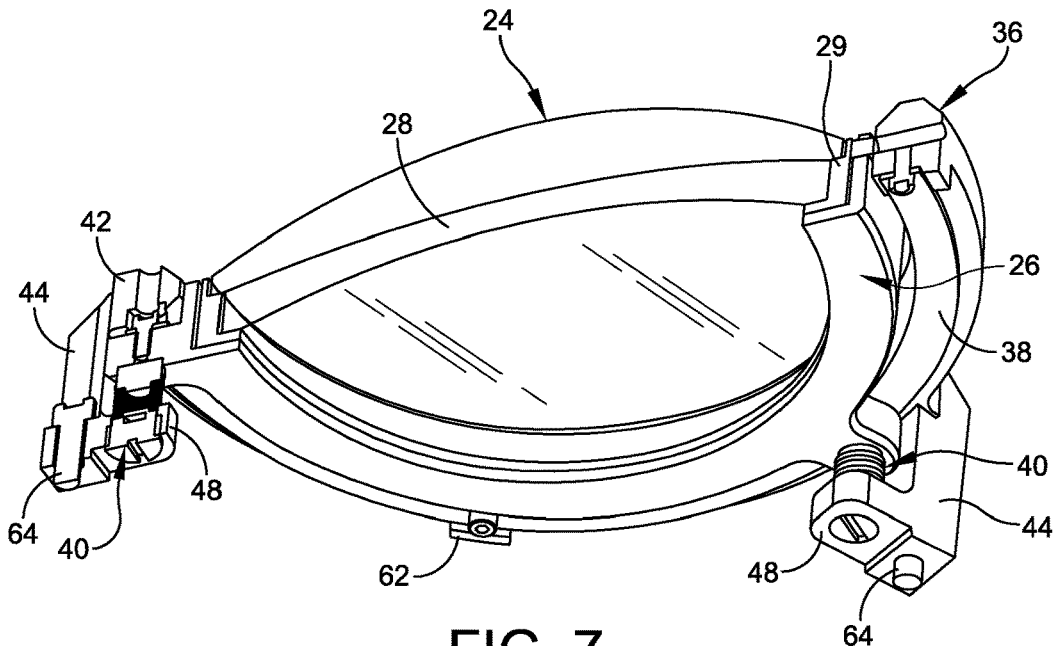
FIG. 7 is a perspective view of a portion of the lens mount assembly.

Referring to FIGS. 4-6, the lens mount assembly 20 includes a ring mount generally indicated at 36, a flexure 38 and three bellows, each generally indicated at 40, which when assembled are configured to secure the lens assembly 24 in place. The lens mount assembly 20 is designed to enable the relative movement of the lens assembly 24 with respect to the ring mount 36 by the provision of the flexure 38 and the three bellows 40. Specifically, the flexure 38 is compliant, and the bellows 40 are adjustable at the end piece 66 thus allowing minor tilt adjustment of the lens assembly 24 with respect to the ring mount assembly 20.

In one embodiment, the ring mount 36 has an annular body 42 having three retaining arms, each indicated at 44, which project perpendicularly from the annular body 42. In the shown embodiment, the retaining arms 44 are spaced equidistant from one another, i.e., 120 degrees, to provide an even force on the lens assembly 24 at three points of engagement. As shown, the annular body 42 of the ring mount 36 includes three openings, each indicated at 46, which are positioned adjacent respective retaining arms 44. These openings 46 are designed to enable access to a threaded fastener when securing the flexure 38 to the ring mount 36.

Each retaining arm 44 includes a tab portion 48 that projects over the lens assembly 24 when the lens assembly is assembled onto the ring mount 36 of the lens mount assembly 20. Each tab portion 48 includes a larger opening 50 sized to receive the bellows 40 or a portion of the bellows therein and a smaller opening 52 sized to receive a positioning pin or fastener to secure the retaining arm 44 of the ring mount 36 of the lens mount assembly 20 in place on the frame 22 of the optical platform 10. The annular body 42 of the ring mount 36 further includes three feet, each indicated at 54, which are spaced between adjacent retaining arms 44, i.e., 120 degrees from one another. In one embodiment, the feet 54 are positioned equidistant between adjacent retaining arms 44 although the distance between any given two feet 54 may vary in alternative embodiments. Each foot 54 includes a retaining edge 56 to firmly secure the flexure 38 within the ring mount 36. In a certain embodiment, the ring mount 36 is fabricated from a metal alloy, such as 6061 aluminum alloy.

The annular flexure 38 is provided to assist in controlling the movement of the lens assembly 24 when the lens assembly is secured to the lens mount assembly 20. The annular flexure 38 can, when needed, provide a preload to both stiffen the bellows 40 in compression as well as increasing the overall lens natural frequency. In one embodiment, the flexure 38 is fabricated from titanium, and is approximately 3.0 inches in diameter, has a width of 0.2 inch and a thickness of 0.020 inch. The flexure 38 is sized to fit within the ring mount 36, and is engaged by the three feet 54 of the ring mount with the retaining edges 56 of the ring feet surrounding an outer edge of the flexure. The direction of expansion of the bellows 40 with respect to the other components of the lens mount assembly 20 can be reversed based on design requirements.

Figure 3:
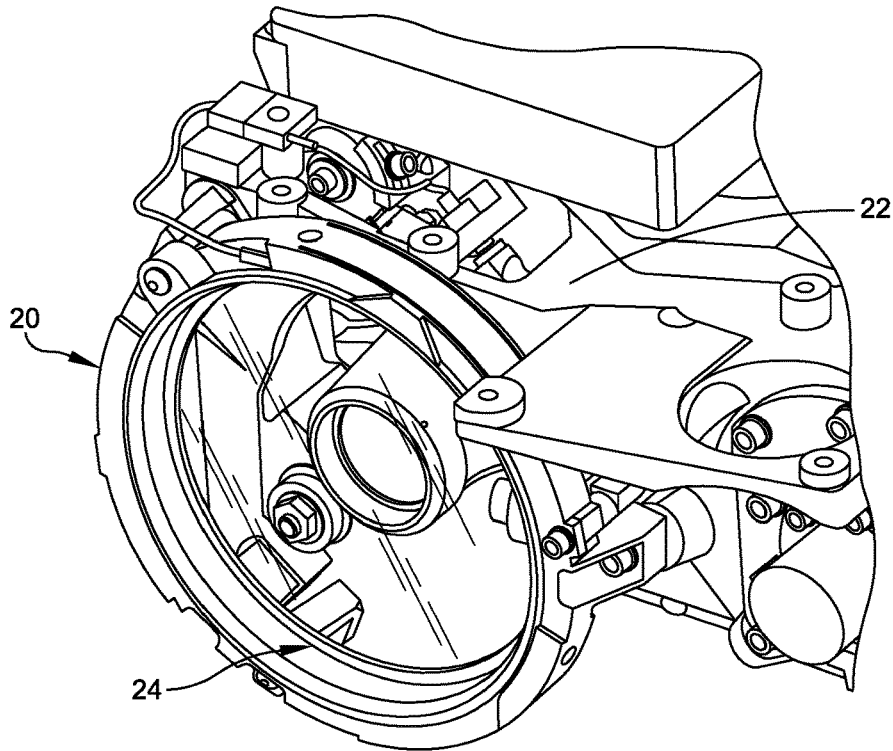
FIG. 3 is a perspective view of a compact passive lens mount assembly of an embodiment of the present disclosure, which is secured to a frame of the optical platform.
Figure 8:
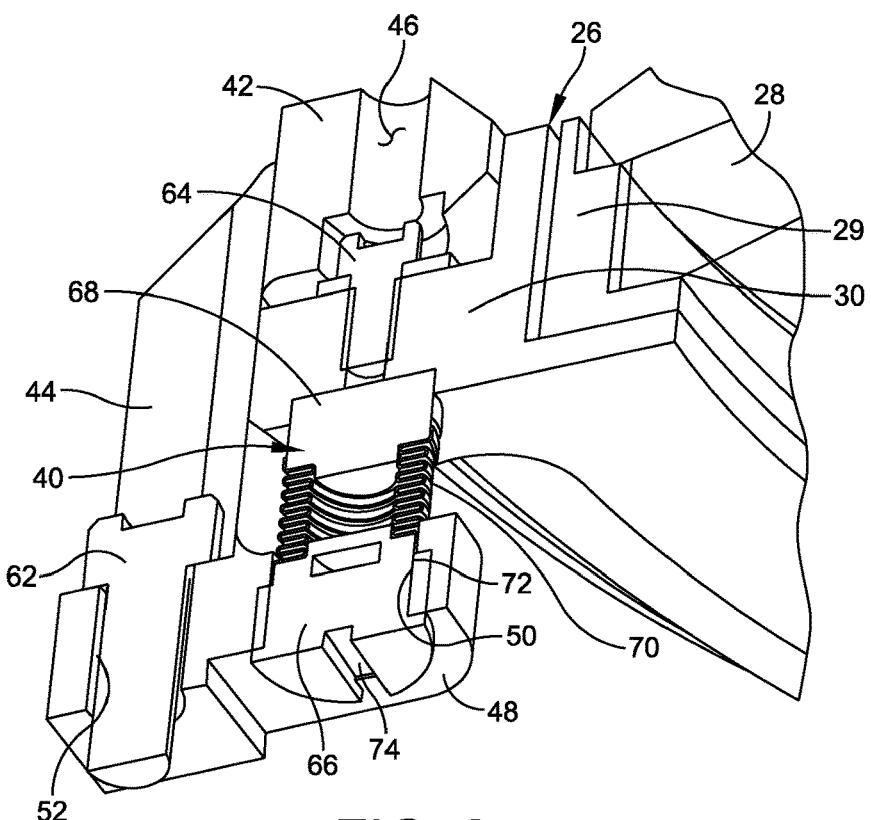
FIGS. 8-10 are enlarged cross-sectional perspective views of features of the lens mount assembly.
Figure 9:
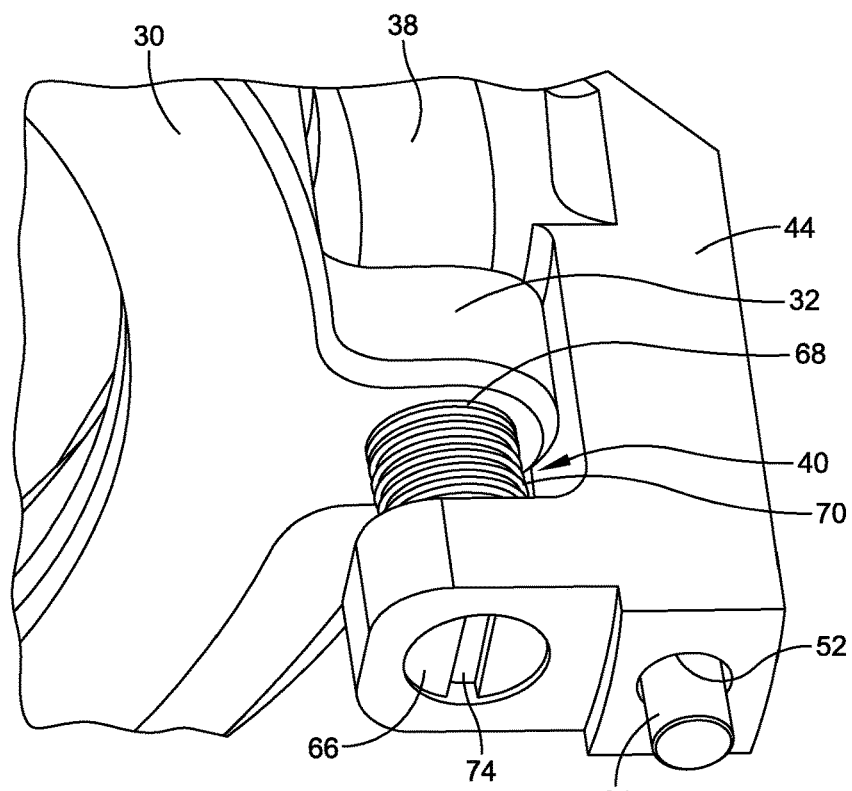
Figure 10:
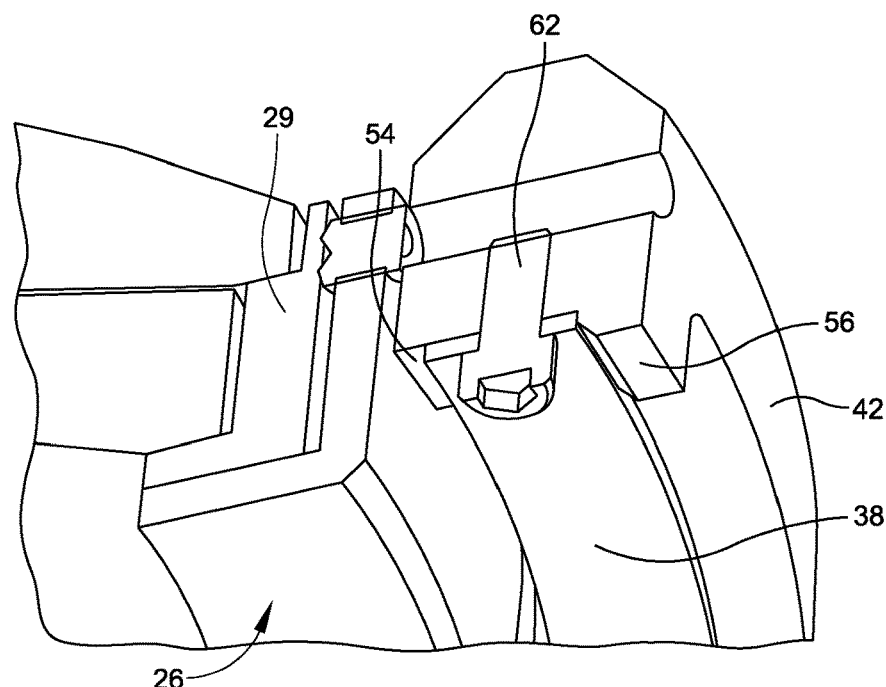

The arrangement is that the lens ring 26 of the lens assembly 24 is positioned against and seated on the flexure 38 when assembling the lens assembly with the lens mount assembly 20. As shown, the flexure 38 includes several (e.g., six) wider portions, each indicated at 58, with each wider portion 58 having an opening 60 formed therein to receive a fastener, e.g., a machine screw therein. In a certain embodiment, three fasteners, each indicated at 62, are used to secure the ring mount 36 of the lens mount assembly 20 to the frame 22 of the optical platform 10. Additionally, six fasteners, each indicated at 64, are used to secure the flexure 38 to the feet 54 of the ring mount 36 by inserting the fasteners through the openings 60 of the wider portions of the flexure. As shown, three fasteners 64 are used to directly secure the flexure 38 to the feet 54 of the ring mount 36 while three fasteners are used to secure the flexure to the tab portion 32 of the lens ring 26 (FIG. 8). When securing the flexure 38 to the annular body 30 of the lens ring 26, the fasteners 64 are accessed through the openings 46 formed in the annular body 42 of the ring mount 36 of the lens mount assembly 20. FIGS. 3-5 illustrate the assembled lens mount assembly 20, while FIG. 6 illustrates the unassembled lens mount assembly.

Referring to FIGS. 7-10, each bellows 40, as mentioned above, is designed to provide some level of compliance in bending, along with the flexure 38, so as to enable minor tilt of the lens assembly 24. As used herein, the term "bellows" may be used to describe a flexible structure whose volume can be changed by compression or expansion. As shown, each bellows 40 includes two cylindrical end pieces 66, 68 separated by a bellow 70. The end pieces 66, 68 may be fabricated from stainless steel, such as 303 stainless steel; however, any suitable metal may be provided. As shown in FIG. 8, end piece 66 includes an outer surface 72, which, in one embodiment, may be configured with threads to threadably engage mating threads provided on an inner surface of the larger opening 50 of the tab portion 48 of the retaining arm 44. The end piece 66 may be configured with a slot 74, which is provided to enable a flat head screwdriver to rotate the end piece 66 to translate the bellow with respect to the retaining arm 44 thus translating the lens assembly 24 as needed. The liquid-filled bellows 40 are not compressible. The end piece 68, which has a polished surface, pushes against the boss 34, which also has a polished surface with low sliding friction. End piece 68 is configured to be seated within the boss 34 of the tab portion 32 of the lens ring 26 when assembled.

The arrangement is that the space between the end pieces 66, 68 as defined by the bellow 70 can be adjusted by axially moving the end piece 66 through rotating clockwise or counterclockwise within the threaded outer surface 72 of the larger opening 50. In one embodiment, the bellow 70 may be an electroformed metal bellow provided by SERVOMETER® of Cedar Grove, N.J. The ends of the bellow 70 are suitably secured to the end pieces 66, 68 to create an airtight attachment. In one embodiment, the space between the end pieces 66, 68 that is surrounded by the bellow 70 is filled with a suitable fluid that is configured for use in single phase heat transfer applications, such as FLUORINERT® electronic liquid (FC-40) provided by 3M Electronics Markets Materials Division of St. Paul, Minn.

To secure the lens mount assembly 20 and the lens assembly 24 together, as mentioned above, the flexure 38 is secured to the feet 54 of the ring mount 36 by the three fasteners 64. Once the flexure 38 is secured, the lens ring 26 of the lens assembly 24 is positioned against the flexure, with the tab portions 32 of the lens ring being rotated to align tab portions 32 of the lens ring with tab portions 48 of the retaining arms 44 of the ring mount 36. Next, the end pieces 66 of the bellows 40 are positioned within the larger openings 50 of the tab portions 48 of the retaining arms 44 of the ring mount 36 and the end pieces 68 are positioned within the bosses 34 of the tab portions 32 of the lens ring 26. The position of the lens assembly 24 with respect to the lens mount assembly 20 may be adjusted by rotating the fasteners 74 of the end pieces 66 of the bellows 40. At this point, rotation of the bellows 40 controls the focus and tilt of the lens assembly 24 with respect to the lens mount assembly 20. Once assembled, the fasteners 62 can be used to secure the ring mount 36 of the lens mount assembly 20 to the frame 22.

Embodiments of the lens mount assembly further improve resistance to damage caused by resonance. Large objective lens assemblies have a higher mass, which makes them susceptible to the destructive effect of resonance. To avoid such damage, it is sometimes desirable to design stiffness in the mount. Preloading is a known method of increasing the natural frequency of a mass spring system similar to a preloaded bearing system. Predictions in natural frequency in preloaded bearing assembly is complicated but very matured. With the embodiments of the lens mount assembly of the present disclosure, the liquid-filled bellows are stiff in compression, but weak in tension. Preloading the bellows is a desirable approach to offset this shortfall in performance and at the same time elevating the natural frequency to a high enough level as to be immune to the operating random vibration.

Embodiments of the present disclosure may include using small springs or spring plungers attached to the ring mount 36 over the tabs 32 to push against the bellows 40 thus alleviating the flexure 38 from providing the preload. The flexure 38 would be in a more neutral state, not having to be deflected as a result. The flexure 38 provides the lateral rigidity to the lens assembly 20 as well as the freedom to move in focus and tilt.

Embodiments of the present disclosure further may include providing at least two flexures 38 supported by the ring mount 36 to provide support to the lens assembly 20 when assembled. The provision of two annular flexures provides resistance to rotation about the X and Y axis. Further, the ring mount 38 can be configured with an integrally formed flexure(s), which is machined directly onto the ring mount by a known process, such as electrical discharge machining ("EDM"), thereby avoiding the need for a separate annular flexure. Also, the lens mount assembly 20 can be configured with two bellows 40, which are spaced apart from one another 180° to provide symmetrical support. The lens mount assembly 20 further can be configured with more than three bellows, which are spaced equidistant from in a manner consistent with the shown embodiment.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A lens mount assembly configured to support a lens assembly having a lens ring and at least one lens secured to the lens ring, the lens mount assembly comprising:
a ring mount including an annular body having at least two retaining arms that project from the annular body;
a compliant, annular flexure configured to be secured to the ring mount, the flexure being sized to fit within the at least two retaining arms of the ring mount; and
at least two bellows, each bellows being configured to be secured to a respective retaining arm of the at least two retaining arms of the ring mount, the at least two bellows further being configured to engage the flexure.

2. The lens mount assembly of claim 1, wherein each retaining arm of the at least two retaining arms project perpendicularly from the annular body of the ring mount.

3. The lens mount assembly of claim 2, wherein the at least two retaining arms include three retaining arms and the at least two bellows include three bellows.

4. The lens mount assembly of claim 3, wherein the three retaining arms are spaced equidistant from one another.

5. The lens mount assembly of claim 3, wherein each retaining arm includes a tab portion that projects over the lens assembly when the lens assembly is assembled onto the ring mount.

6. The lens mount assembly of claim 5, wherein each tab portion includes a first opening sized to receive at least a portion of the bellows therein and a second opening sized to receive a positioning pin or fastener to secure the retaining arm of the ring mount of the lens mount assembly in place.

7. The lens mount assembly of claim 3, wherein the ring mount further includes three feet, which are spaced between adjacent retaining arms.

8. The lens mount assembly of claim 7, wherein the feet are positioned equidistant between adjacent retaining arms.

9. The lens mount assembly of claim 7, wherein each foot includes a retaining edge to firmly secure the flexure within the ring mount.

10. The lens mount assembly of claim 9, wherein the flexure is sized to fit within the ring mount, and is engaged by the three feet of the ring mount with the retaining edges of the ring feet surrounding an outer edge of the flexure.

11. The lens mount assembly of claim 1, wherein each bellows includes two cylindrical end pieces and a bellow positioned between the end pieces.

12. The lens mount assembly of claim 11, wherein a first end piece includes an outer surface that is configured to engage a tab portion of the retaining arm of the ring mount within an opening of the tab portion, the outer surface and the opening being threaded to allow for fine adjustment.

13. The lens mount assembly of claim 12, wherein a second other end piece is configured to be seated within a boss of a tab portion of the lens ring when assembled.

14. The lens mount assembly of claim 11, wherein a space between the end pieces that is surrounded by the bellow is filled with a fluid that is configured for use in single phase heat transfer applications.

15. A lens mount assembly configured to support a lens assembly having a lens ring and at least one lens secured to the lens ring, the lens mount assembly comprising:
- a ring mount including an annular body having three retaining arms that each project from the annular body;
- a flexure configured to be secured to the ring mount; and
- three bellows, each bellows being configured to be secured to a respective retaining arm of the three retaining arms of the ring mount, the three bellows further being configured to engage the flexure,
- wherein each retaining arm of the three retaining arms project perpendicularly from the annular body of the ring mount,
- wherein the ring mount further includes three feet, which are spaced between adjacent retaining arms, and
- wherein the flexure includes three wide portions, each wide portion having an opening formed therein to receive a fastener therein to secure the flexure to the feet of the ring mount.

16. A method of assembling a lens assembly including a lens ring and at least one lens to a lens mount assembly including a ring mount having an annular body including at least two retaining arms that project from the annular body, a compliant, annular flexure and at least two bellows, the method comprising:
- securing the flexure of the lens mount assembly to the ring mount of the lens mount assembly, the flexure being sized to fit within the at least two retaining arms of the ring mount;
- positioning the lens ring of the lens assembly against the flexure so that tab portions of the lens ring is aligned with tab portions of the ring mount; and
- securing the bellows to the ring mount so that the bellows engage the lens ring.

17. The method of claim 16, wherein the flexure is secured to feet of the ring mount by at least two fasteners.

18. The method of claim 17, wherein the at least two fasteners are accessed through openings provided in the ring mount.

19. The method of claim 16, wherein the bellows are secured to the ring mount by a plurality of fasteners.

20. An optical platform comprising:
- a housing; and
- an optical device configured to be supported by the housing, the optical device comprising
  - a lens assembly, and
  - a lens mount assembly configured to support the lens assembly, the lens mount assembly comprising
    - a ring mount including an annular body having at least two retaining arms that project from the annular body,
    - a compliant, annular flexure configured to be secured to the ring mount, the flexure being sized to fit within the at least two retaining arms of the ring mount, and
    - at least two bellows, each bellows being configured to be secured to a respective retaining arm of the at least two retaining arms of the ring mount and to engage the flexure.

* * * * *

UNITED STATES PATENT AND TRADEMARK OFFICE
CERTIFICATE OF CORRECTION

PATENT NO. : 10,095,089 B2
APPLICATION NO. : 15/156865
DATED : October 9, 2018
INVENTOR(S) : Li Chiao Po et al.

Page 1 of 1

It is certified that error appears in the above-identified patent and that said Letters Patent is hereby corrected as shown below:

In the Specification

Column 3, Line 18, should read:
Passive athermal lens mounts are critical to minimizing Column 3, Line 35, should read:
An athermal lens mount assembly disclosed herein Column 3, Lines 45-46, should read:
The flexure on the athermal lens mount assembly also provides the stiffness to Column 4, Line 65, should read:
FLIR window 18 includes an athermal lens mount assembly Signed and Sealed this
Eleventh Day of December, 2018

Andrei Iancu
*Director of the United States Patent and Trademark Office*